INVENTOR.
ROBERT E. RAYMOND
BY
Schmieding & Sultz
ATTORNEYS

INVENTOR.
ROBERT E. RAYMOND
BY
Schmieding & Fultz
ATTORNEYS

United States Patent Office 3,502,036
Patented Mar. 24, 1970

3,502,036
HYDRAULIC RESERVOIR AND ASSOCIATED MOUNTING MEANS ENCLOSURE FOR SYSTEM COMPONENTS
Robert E. Raymond, Zanesville, Ohio, assignor to International Basic Economy Corporation, New York, N.Y.
Filed Sept. 18, 1968, Ser. No. 760,403
Int. Cl. F04b 21/00
U.S. Cl. 103—218                                    5 Claims

ABSTRACT OF THE DISCLOSURE

A hydraulic reservoir and associated mounting means enclosure for system components wherein the enclosure is in the form of an auxiliary frame means pivotally mounted to the reservoir so as to be selectively positionable in either in operational position or in a swing-down access position. In the access position said components are readily accessible for adjustment or servicing.

---

This invention relates to hydraulic apparatus and more particularly to a novel hydraulic reservoir and associated mounting means enclosure for system components which are combined together in a unique manner.

In general, the hydraulic apparatus of the present invention is adaptable to various hydraulic power packages and associated control systems such as those that include a pump and associated motor for driving same, a reservoir for supplying fluid to the pump and system, and associated system components, conduits, and controls.

In accordance with the present invention, the apparatus comprises a main frame that includes a reservoir for supplying and receiving hydraulic fluid for the system, and an auxiliary frame means pivotally mounted to the main frame means so as to be selectively positionable in either an operational position, or in a swing-down access position.

One or more hydraulic machines, such as pumps and motors, are supported by the main frame means and various components for the system such as valves, conduits or the like, are mounted on the auxiliary frame means, the latter being preferably formed as an enclosure for the components.

The apparatus further includes one or more terminal bars mounted along the exterior of an edge of said auxiliary frame means, with a plurality of couplings being carried by said terminal bars for accessible connection and disconnection of the components with the hydraulic machine carried by the main frame means.

As another aspect of the present invention the above-mentioned auxiliary frame means is provided with a front panel for supporting gauges, controls and the like and can also include removable side walls that provide access to the interior of the component enclosure formed by the auxiliary frame means.

In accordance with the present invention, the above described arrangement of hydraulic apparatus permits the efficient and compact mounting of complex hydraulic components and piping with ready accessibility and neat appearance.

As another aspect of the present invention the two frame means and components are arranged such that the auxiliary frame means and the components mounted thereon can be swung down to an access position wherein the components are readily accessible for servicing.

As another aspect of the present invention the component enclosure feature permits certain critically adjusted components, such as control valves, to be packaged in a relatively inaccessible region of a component enclosure thereby protecting same from tampering.

As still another aspect of the present invention the auxiliary frame means is provided with one or more terminal bars each of which mounts a plurality of line couplings thereby providing a very effective way of grouping coupling terminals for simplicity of servicing, modifying or testing the system.

Further objects and advantages of the present invention will be apparent from the following description, reference being had to the accompanying drawings wherein preferred forms of embodiments of the invention are clearly shown.

Figure 3:
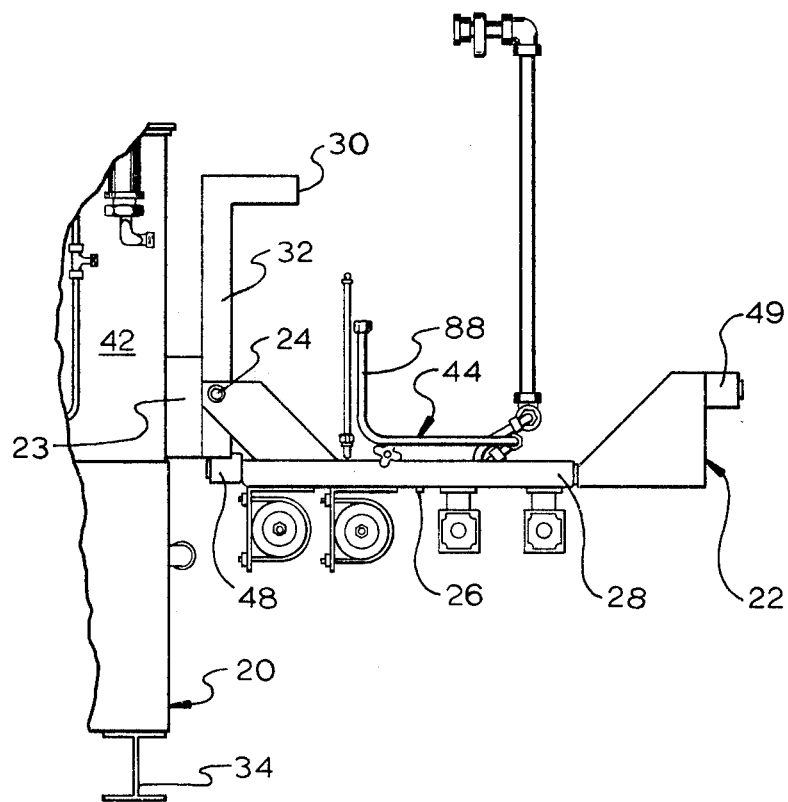
Figure 4:
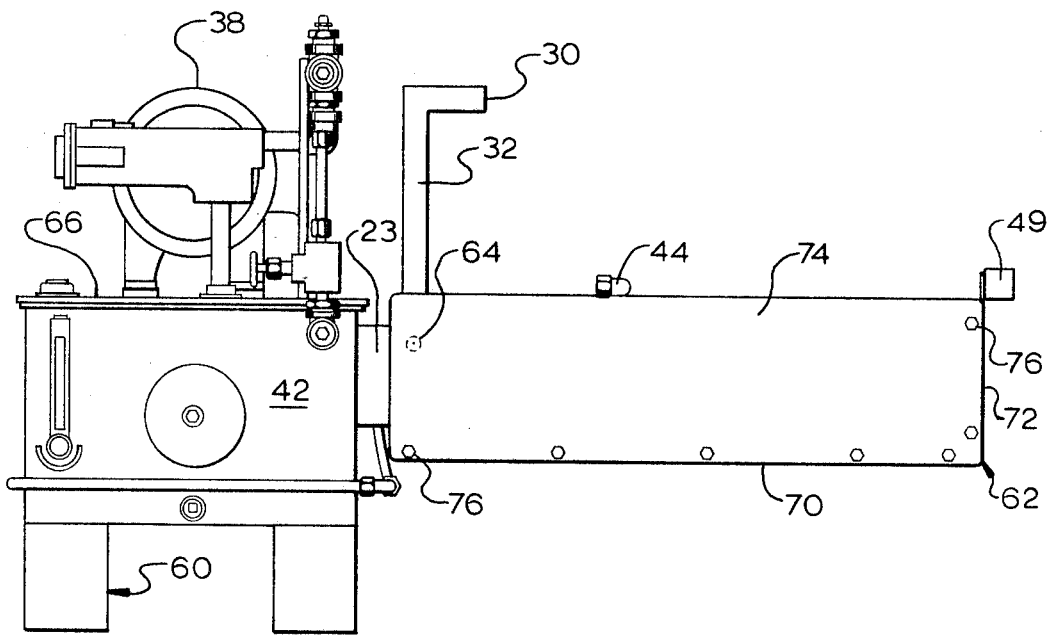

FIG. 3 is a partial side elevational view of the hydraulic apparatus of the preceding figures which view shows the auxiliary frame means disposed in an access position; and FIG. 4 is a side elevational view of a modified hydraulic apparatus constructed in accordance with the present invention, said view showing a modification wherein the hydraulic reservoir portion of the main frame means serves as a support for a hydraulic machine. This view also shows the auxiliary frame means in the form of a component enclosure with removable side panels.

Referring in detail to the drawings, the hydraulic apparatus of the present invention comprises a main frame means indicated generally at 20. An auxiliary frame means indicated generally at 22 is pivotally mounted to said main frame means at a pivot means shown in the form of a removable pivot rod 24.

Figure 1:
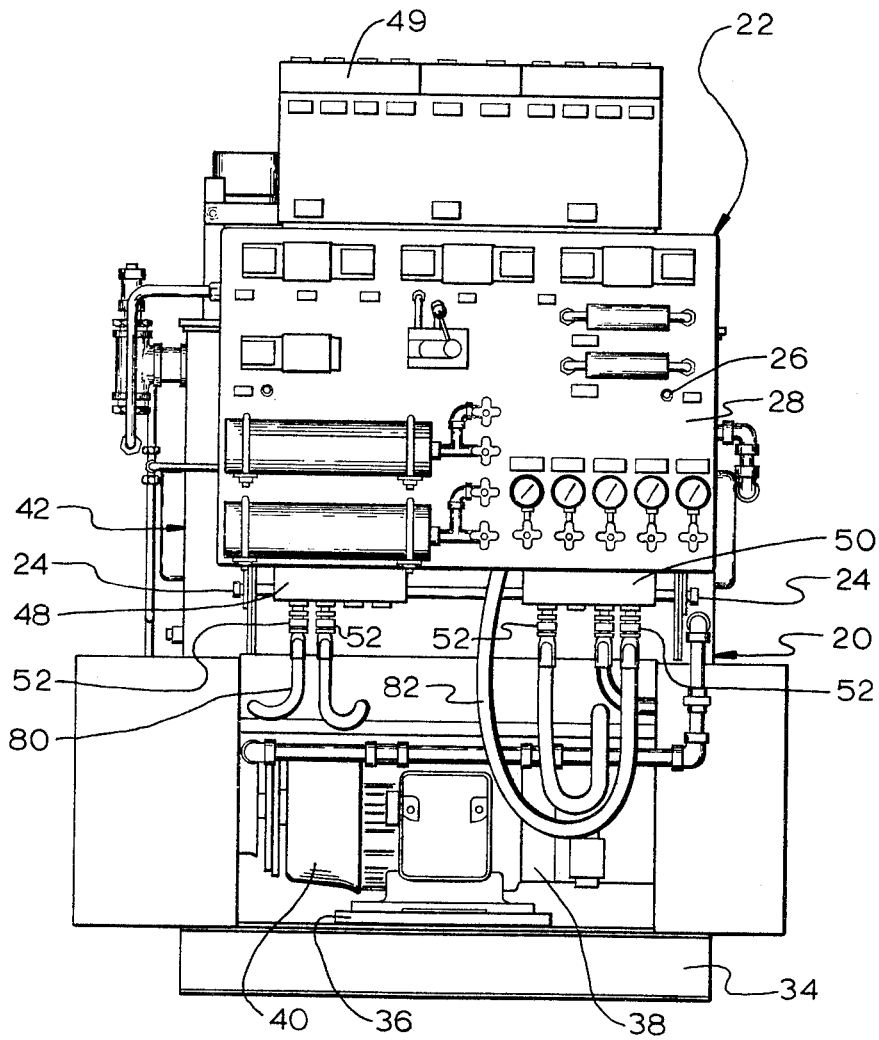
FIG. 1 is a front elevational view of a hydraulic apparatus constructed in accordance with the present invention.
Figure 2:
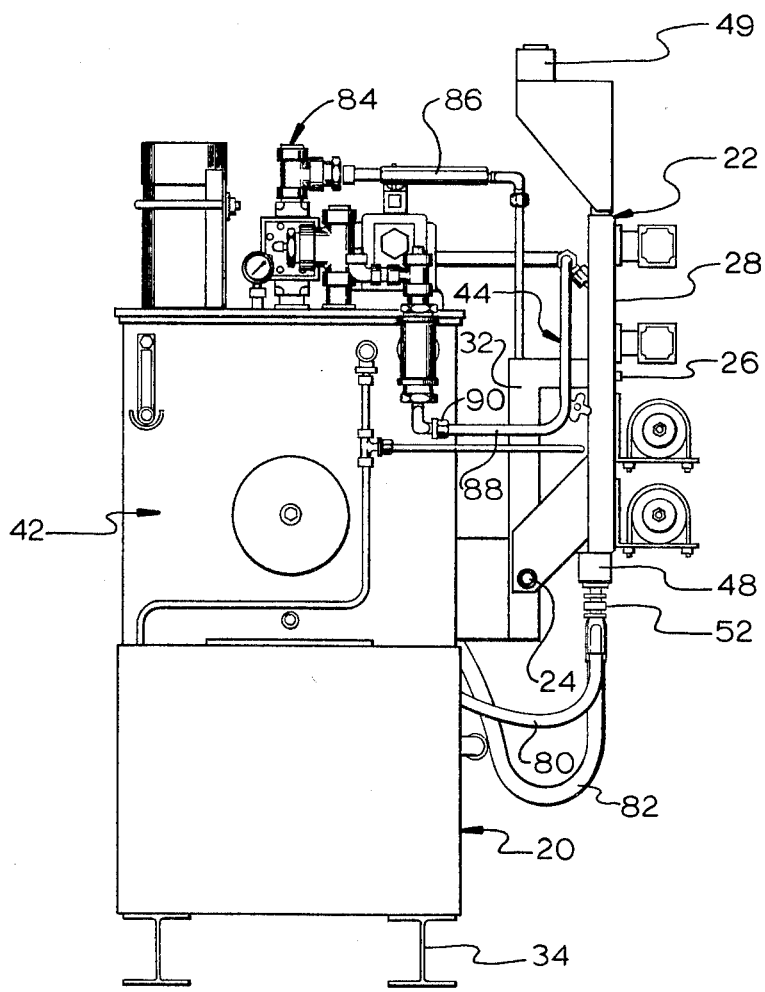
FIG. 2 is a side elevational view of the hydraulic apparatus of FIG. 1 which view shows an auxiliary frame means disposed in an operational position.

With continued reference to FIGS. 1 through 3 auxiliary frame means 22 is normally disposed in an upright operational position of FIGS. 1 and 2 and is maintained in such position by a suitable latch means such as bolts 26 which bolts extend through a front panel 28 of the auxiliary frame means and engage threaded holes 30, FIG. 3, in upright brackets 32.

As is best seen in FIG. 1, frame means 20 includes a base structure 34 including a mounting plate 36 that supports a hydraulic machine such as a pump 38 and electric motor 40 for supplying pressurized fluid from a reservoir 42 to the system.

It will be noted from FIGS. 1–3 that reservoir 42 is part of the structure of the main frame means designated generally at 20.

As is best seen in FIGS. 2 and 3, the inner side of panel 28 of auxiliary frame means 22 supports a plurality of hydraulic components such as valves, controls, conduits, and the like. For purposes of the present description any selected grouping of such components will be indicated generally at 44.

As seen in FIGS. 1–3, one or more terminal bars 48 and 50 are mounted on an outer edge of auxiliary frame means 22, and a plurality of line couplings 52 are mounted on the terminal bars so as to provide a readily accessible connecting and disconnecting means between hydraulic machine 38 and the system components 44 mounted on auxiliary frame means 22.

Reference is next made to FIG. 4 which illustrates a modified hydraulic apparatus constructed in accordance with the present invention that includes a main frame means indicated generally at 60 which supports a hydraulic reservoir 42, the latter in turn including a top wall 66 that serves as a mounting base for a hydraulic machine 38.

The embodiment of FIG. 4 further includes an auxiliary frame means indicated generally at 62 that is pivotally mounted to a bracket 23 on the main frame means 60 at a removable pivot rod 64 whereby said auxiliary frame means can be selectively positioned either in the swing-down position of FIG. 4 or in an upright operational position such as the configuration shown in FIG. 2.

It should be pointed out that the apparatus of FIG. 4 is similar to that of the embodiment of FIGS. 1–3. However, in FIG. 4, the hydraulic machine 38 is mounted above the reservoir whereas in the former embodiment the hydraulic machine 38 was mounted below the reservoir.

Also, in the embodiment of FIG. 4, the auxiliary frame means 62 forms a component enclosure that includes a front wall 70, top wall 72, and removable side walls 74, the latter being detachable from auxiliary frame means 62 by removing the bolts 76 thereby providing access to system components 44 mounted within the confines of said walls.

With continued reference to FIG. 4 it will be noted that an outer edge of auxiliary frame means 62 supports terminal bars 49 provided with ports adapted to receive couplings such as those shown at 52 in the apparatus of FIGS. 1–3.

It should be pointed out that in both the embodiment of FIGS. 1–3 and the modified embodiment of FIG. 4, standard reservoir structures, of various depths and capacities, can be utilized. Such reservoirs are provided with flanges 23 for accepting the pivotal mounting of various standard auxiliary frame means such as the one shown at 22 in FIGS. 1–3, or various standard auxiliary frame means with removable closure walls such as the one shown at 62 in FIG. 4.

In operation, the auxiliary frame means 22 or 62 is disposed in an upright position, such as seen in FIG. 2, with the hydraulic machine 38 and reservoir 42 connected to the system components 44 on the auxiliary frame means 22 or 62, with such components being connected by couplings 52 and various flexible conducts such as those seen at 80 and 82 in FIGS. 1 and 2.

Also as seen in FIG. 2 various components or controls on the reservoir, such as those indicated generally at 84 are coupled to system components 44 carried by auxiliary frame means 22 by various conduits such as the ones seen at 86 and 88 with various detachable connections such as those seen at 90 in FIG. 2.

With auxiliary frame means 22 in the normal upright operating position shown in FIG. 2, when it is desired to gain access to the system components 44 either for servicing or to make adjustments in inaccessible system components, the latch screws 26 are removed from threaded holes 30 and certain of the couplings, such as the coupling seen at 90, are disconnected and auxiliary frame means 22 is moved to the swing-down position of FIG. 3. In this position system components 44 and the conduits connecting same are readily accessible for servicing.

If desired terminal bar couplings 52 can also be disconnected, as seen in FIG. 3, and pivot rod 24 removed whereby the entire auxiliary frame means 22 or 62 can be removed from the main frame means and moved to a remote location for servicing as a unit.

I claim:

1. A hydraulic apparatus comprising in combination, main frame means including a reservoir; a hydraulic machine mounted on said main frame means; and auxiliary frame means pivotally mounted on said main frame means and selectively positionable in an operational position or an access position; system components including conduits for connection with said hydraulic machine mounted on said auxiliary frame means; a plurality of couplings connecting said conduits to said hydraulic machine; and means for maintaining said auxiliary frame means in certain of said positions.

2. The hydraulic apparatus defined in claim 1 that includes a terminal bar disposed along an edge portion of said auxiliary frame means, said couplings being mounted on said terminal bar.

3. A hydraulic apparatus comprising, in combination, main frame means including a reservoir; a hydraulic machine mounted on said main frame means; auxiliary frame means forming a component enclosure including a front wall, side walls, and a lower portion pivotally mounted to said main frame means, said auxiliary frame means being selectively positionable in either an upright operational position or a swing-down access position; system components mounted in said component enclosure; and coupling means detachably connecting said system components with said hydraulic machine.

4. The apparatus defined in claim 3 wherein said side walls are removable to provide access openings for said component enclosure.

5. A hydraulic apparatus comprising, in combination, main frame means including a reservoir; a hydraulic machine mounted on said main frame means; auxiliary frame means forming a component enclosure including a front wall, side walls, and a lower portion pivotally mounted to said main frame means, said auxiliary frame means being selectively positionable in either an upright operational position or a swing-down access position; system components mounted in said component enclosure; terminal bar means mounted along an edge of said auxiliary frame means; a plurality of coupling means mounted on said terminal bar means exterior of said component enclosure; and a plurality of conduits connecting said coupling means with said hydraulic machine.

References Cited

UNITED STATES PATENTS

| 3,040,669 | 6/1962 | Rupp. |
| 3,042,266 | 7/1962 | Mies _____ 222—383 XR |

ROBERT M. WALKER, Primary Examiner

U.S. Cl. X.R.

222—383